(12) United States Patent
Okuma et al.

(10) Patent No.: US 8,739,684 B2
(45) Date of Patent: Jun. 3, 2014

(54) FLUID PRESSURE APPARATUS

(75) Inventors: Masahiro Okuma, Kitasoma-gun (JP); Yasunaga Suzuki, Kitakatsushika-gun (JP)

(73) Assignee: SMC Kabushiki Kaisha, Tokyo (JP)

( * ) Notice: Subject to any disclaimer, the term of this patent is extended or adjusted under 35 U.S.C. 154(b) by 452 days.

(21) Appl. No.: 13/107,230

(22) Filed: May 13, 2011

(65) Prior Publication Data
US 2011/0283880 A1 Nov. 24, 2011

(30) Foreign Application Priority Data
May 19, 2010 (JP) ................................. 2010-115074

(51) Int. Cl.
*F16J 15/18* (2006.01)
*F16J 9/12* (2006.01)

(52) U.S. Cl.
USPC .............................. 92/165 R; 92/244; 92/250

(58) Field of Classification Search
USPC ............... 92/139, 165 R, 240, 243, 244, 250; 277/436–439, 589
See application file for complete search history.

(56) References Cited

U.S. PATENT DOCUMENTS

| 2,765,204 | A | | 10/1856 | Josephson |
| 2,349,170 | A | | 5/1944 | Jackman |
| 3,473,814 | A | * | 10/1969 | Bastow ........................ 277/436 |
| 3,582,094 | A | * | 6/1971 | Whittaker ..................... 277/589 |
| 3,583,712 | A | | 6/1971 | Domros et al. |
| 3,771,801 | A | | 11/1973 | Burke |
| 3,920,252 | A | * | 11/1975 | Dechavanne ................. 277/437 |
| 4,059,280 | A | | 11/1977 | Eastwood |
| 4,177,837 | A | * | 12/1979 | Frank et al. .................... 277/434 |
| 4,305,595 | A | * | 12/1981 | Miyagishima et al. ....... 277/638 |
| 4,484,512 | A | * | 11/1984 | Dechavanne ................... 92/244 |
| 4,576,386 | A | | 3/1986 | Benson et al. |
| 4,577,874 | A | | 3/1986 | Zitting |
| 5,014,603 | A | | 5/1991 | Navarette et al. |

(Continued)

FOREIGN PATENT DOCUMENTS

| EP | 0048707 A2 | 3/1982 |
| EP | 0219689 A2 | 4/1987 |

(Continued)

OTHER PUBLICATIONS

U.S. Appl. No. 13/107,312, filed May 13, 2011, Okuma, et al.

(Continued)

*Primary Examiner* — Michael Leslie
(74) *Attorney, Agent, or Firm* — Oblon, Spivak, McClelland, Maier & Neustadt, L.L.P.

(57) ABSTRACT

In a fluid pressure apparatus, a packing includes an annular seal member made of an elastic material, and support rings made of a low-friction material, which are mounted on an outer circumference of the seal member. The seal member includes, on an outer circumference thereof, a sealing projection that contacts an inner surface of the slide hole. The support rings are disposed on both sides of the sealing projection, and protrude beyond the seal member in the axial direction. Outer circumferential surfaces of the support rings always contact the inner circumferential surface of the slide hole. When a transverse load does not act on a piston as a partitioning member, the inner circumferential surfaces of the support rings do not contact the outer circumference of the piston. When a transverse load acts on the piston, the inner circumferential surfaces of the support rings contact the outer circumference of the piston.

4 Claims, 6 Drawing Sheets

(56) References Cited

U.S. PATENT DOCUMENTS

| | | | |
|---|---|---|---|
| 5,385,081 A * | 1/1995 | Sneddon | 92/165 R |
| 5,390,939 A | 2/1995 | Terauchi et al. | |
| 5,524,905 A | 6/1996 | Thoman et al. | |
| 5,879,010 A | 3/1999 | Nilkanth et al. | |
| 6,173,964 B1 | 1/2001 | Bell et al. | |
| RE42,654 E | 8/2011 | Zitting | |
| 8,246,055 B2 | 8/2012 | Asplund et al. | |
| 2011/0283880 A1 | 11/2011 | Okuma et al. | |

FOREIGN PATENT DOCUMENTS

| | | |
|---|---|---|
| GB | 1 274 999 | 5/1972 |
| GB | 1 316 841 | 5/1973 |
| GB | 1 512 181 | 5/1978 |
| GB | 2077368 A | 12/1981 |
| JP | 46-003861 | 11/1971 |
| JP | 53-65553 | 6/1978 |
| JP | 60-121560 | 8/1985 |
| JP | 61-032862 | 2/1986 |
| JP | 5-505012 | 7/1993 |
| JP | 08-326914 | 12/1996 |
| JP | 9-72310 | 3/1997 |
| JP | 2000-074009 | 3/2000 |
| JP | 2003-120602 | 4/2003 |

OTHER PUBLICATIONS

U.S. Appl. No. 13/107,285, filed May 13, 2011, Okuma, et al.
Office Action mailed Jan. 7, 2014, in Japanese Application No. 2010-115074, filed May 19, 2010, pp. 1-4, (Partial English Translation).
Office Action mailed Jan. 7, 2014, in Japanese Application No. 2010-115077, filed May 19, 2010, pp. 1-4, (Partial English Translation).
Office Action of Mar. 4, 2014 issued in Japanese patent application No. 2010/115079 which corresponds to U.S. Appl. No. 13/107,285.

* cited by examiner

FLUID PRESSURE APPARATUS

CROSS-REFERENCE TO RELATED APPLICATION

This application is based upon and claims the benefit of priority from Japanese Patent Application No. 2010-115074 filed on May 19, 2010, of which the contents are incorporated herein by reference.

BACKGROUND OF THE INVENTION

1. Field of the Invention

The present invention relates to a fluid pressure apparatus of a fluid pressure cylinder or a fluid changeover valve or the like, and more specifically, concerns a fluid pressure apparatus in which an improved packing is installed to a partitioning member comprising a piston or a spool or the like, which moves in the interior of a slide hole defined in a housing.

2. Description of the Related Art

A fluid pressure cylinder generally includes a piston that moves in an axial direction along the interior of a slide hole formed in a housing. A packing (o-ring) made of an elastic rubber material is installed on the outer circumference of the piston, such that through the packing, sealing is effected between the inner circumference of the slide hole and the outer circumference of the piston (For example, see Japanese Laid-Open Patent Publication No. 09-072310 and Japanese Laid-Open Patent Publication No. 2003-120602).

Further, in such conventional techniques, together with the packing, a wear ring is provided on the piston, the wear ring being made from a material (e.g., a synthetic resin) having a hardness greater than that of the packing and which is superior in terms of slidability. In the case that a transverse load acts on the piston in a direction tending to cause misalignment between the axis of the slide hole and the axis of the piston (i.e., in a direction perpendicular to the piston axis), misalignment of the piston axis is suppressed by the wear ring, and excessive deformation of the packing due to pressing of the inner surface of the slide hole against the packing is prevented. Also, the outer circumference of the piston is prevented by the wear ring from coming into contact with the inner circumference of the slide hole.

SUMMARY OF THE INVENTION

However, in such conventional techniques, since the packing and the wear ring are both installed to the piston, the number of parts is large, thereby making the sealing section complicated in structure. Also, since the packing and the wear ring are arranged on the piston in the axial direction of the piston at an interval, the size of the piston in the axial direction is large.

The present invention has been made in view of the above problems, and an object of the present invention is to provide a fluid pressure apparatus including a packing which has a function to prevent a partitioning member such as a piston from coming into contact with the inner circumference of the slide hole and which is capable of simplifying the structure of a sealing section and curbing the increase in the size of the piston in the axial direction.

To achieve the above object, the invention of the present application is characterized by a fluid pressure apparatus comprising: a housing including a slide hole formed therein; a partitioning member that moves in an axial direction along an interior of the slide hole; and a packing that is installed on an outer circumference of the partitioning member, wherein the packing comprises an annular seal member made of an elastic material, and at least one support ring made of a low-friction material, the seal member being installed in an annular packing installation groove formed on an outer circumference of the partitioning member, the at least one support ring being mounted on an outer circumference of the seal member; the seal member includes, on the outer circumference thereof, a sealing projection that contacts an inner circumferential surface of the slide hole, and at least one shoulder portion formed on both sides or one side of the sealing projection and which project outwardly from the packing installation groove; the at least one support ring is provided on both sides or one side of the sealing projection, and protrudes from the seal member in an axial direction thereof; and the at least one support ring includes a support surface, which is parallel on an outer circumference thereof with an axial direction of the partitioning member, and wherein when a transverse load does not act on the partitioning member, the sealing projection is pressed against the inner circumferential surface of the slide hole and thereby is elastically compressed and deformed, and the support surface of the at least one support ring contacts with the inner circumferential surface of the slide hole while an inner circumferential surface of the at least one support ring is out of contact with the outer circumference of the partitioning member; and when at least a certain amount of transverse load acts on the partitioning member, the sealing projection is pressed against the inner circumferential surface of the slide hole and thereby is elastically compressed and deformed, and the support surface of the at least one support ring contacts with the inner circumferential surface of the slide hole while the inner circumferential surface of the at least one support ring contacts with the outer circumference of the partitioning member.

With the above structure, when a transverse load acts on the piston, part of the inner circumferences of the support rings is in contact with part of the outer circumference of the piston, whereby a transverse displacement of the piston is regulated. As a result, the sealing projection of the seal member is prevented from excessively deforming, and the piston is prevented from contacting with the inner circumferential surface of the slide hole. Thus, since the support rings have at least functions equivalent to those of a conventional wear ring, it is not necessary to arrange a separate wear ring together with the packing at an interval in the direction of the axis of the piston. Accordingly, the present invention is simple in structure, and increase in the size of the piston in the direction of the axis can be suppressed.

In the fluid pressure apparatus of the present invention, the seal member may further include, on the outer circumference thereof, at least one concave groove interposed between the at least one shoulder portion and the sealing projection, the at least one support ring may further include, on the inner circumference thereof, at least one projection for engagement, and by engagement of the at least one projection in the at least one concave groove, the at least one support ring is mounted on the seal member so as to surround an outer circumference of the at least one shoulder portion.

With the above structure, the support rings can be mounted on the seal member more easily.

In the fluid pressure apparatus of the present invention, a deformation amount of the sealing projection due to elastic compression may be the same whether a transverse load acts on the partitioning member or not.

With the above structure, whether a transverse load acts on the piston or not, the support rings at all times are in contact with the inner circumferential surface of the slide hole, and accordingly the deformation amounts of the sealing projection in respective states are the same. Thus, the contact surface pressure and the contact area between the sealing projection and the slide hole are the same whether a transverse load acts on the piston or not. Therefore, it becomes easier to manage the sliding resistance of the piston.

In the fluid pressure apparatus of the present invention, an inner circumferential projection for sealing may be formed on the inner circumference of the seal member in elastic contact with a groove bottom of the packing installation groove.

With the above structure, by the inner circumferential projection formed on the inner circumference of the seal member, an interface between the inner circumference of the seal member and the groove bottom of the packing installation groove is sealed, and flow of fluid therebetween is blocked effectively.

Therefore, the fluid pressure apparatus according to the present invention has advantageous effects that the fluid pressure apparatus has a function to prevent a partitioning member from coming into contact with the inner circumference of the slide hole and which is capable of simplifying the structure of a sealing section and curbing the increase in the size of the piston in the axial direction.

The above and other objects features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

A preferred embodiment of a fluid pressure apparatus according to the present invention shall be presented and described in detail below with reference to the accompanying drawings.

Figure 1:
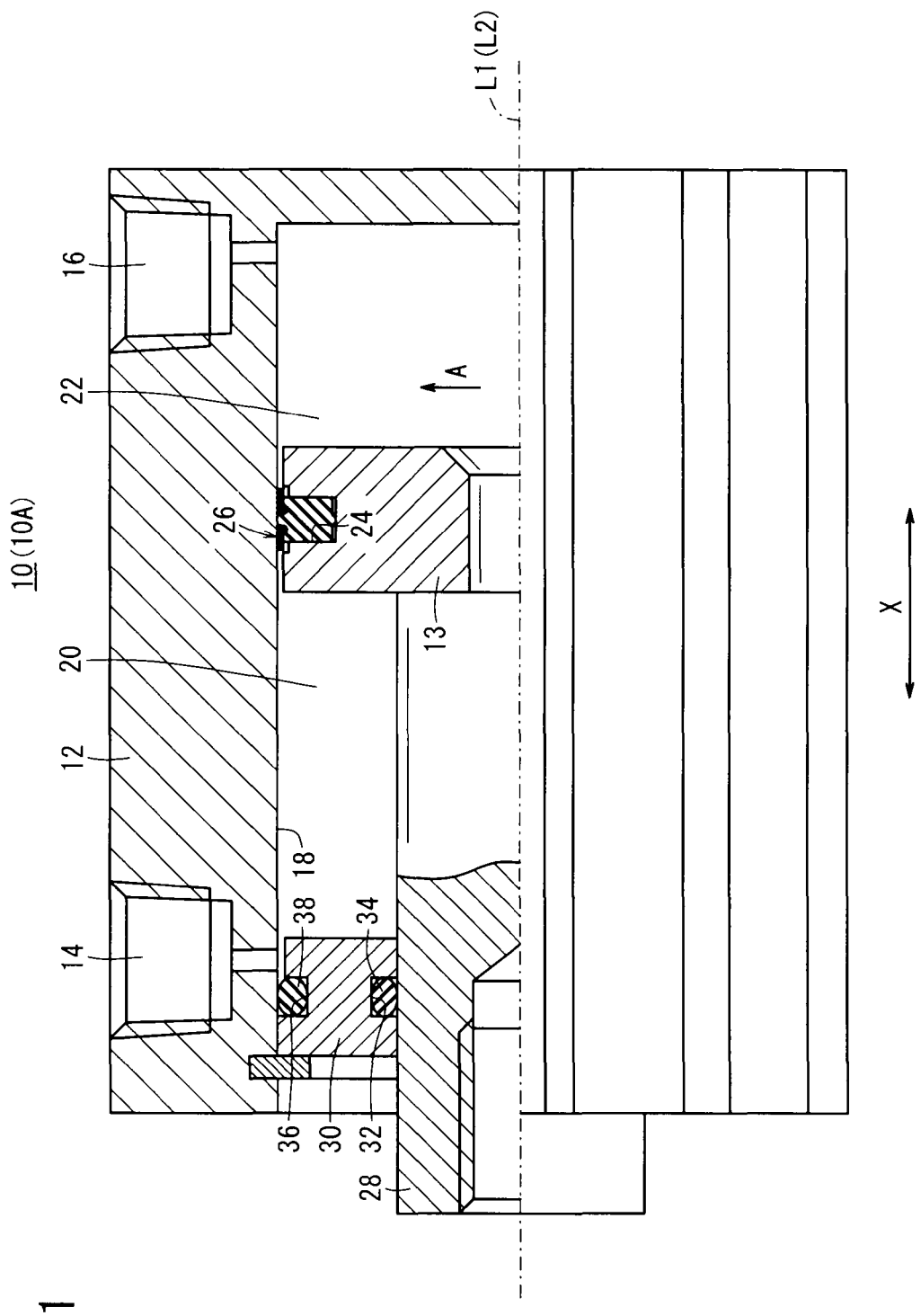
FIG. 1 is a partial cross sectional side view of a fluid pressure apparatus according to an embodiment of the present invention.

FIG. 1 is a partial cross sectional side view of a fluid pressure apparatus 10 according to an embodiment. In the present embodiment, the fluid pressure apparatus 10 is constructed as a fluid pressure cylinder 10A in which a piston 13 reciprocates in a housing 12. The fluid pressure cylinder 10A includes a housing 12 made from a metallic material such as an aluminum alloy or the like, which is equipped with a pair of ports 14, 16, and a slide hole 18 that communicates between the pair of ports 14, 16, the slide hole 18 forming the interior of the housing 12. In the interior of the slide hole 18, there is provided a piston 13 made from a metallic material.

In FIG. 1, reference character L1 denotes an axis of the piston 13, and reference character L2 denotes an axis of the slide hole 18. In a state shown in FIG. 1, the axis L1 of the piston 13 coincides with the axis L2 of the slide hole 18. The piston 13 is accommodated in the housing 12. The piston 13 is a displacement body which can be displaced in directions of the axis L2 of the slide hole 18 (indicated by an arrow X in FIG. 1) while partitioning the interior of the slide hole 18 into two pressure chambers, i.e., a pressure chamber 20 on the port 14 side and a pressure chamber 22 on the port 16 side. Stated otherwise, the piston 13 according to the present embodiment forms a partitioning member which is displaced in directions of the axis L2 in the slide hole 18.

A packing installation groove 24 is formed on the outer circumference of the piston 13, with a ring-shaped or annular packing 26 made of an elastic rubber material being installed in the packing installation groove 24. By means of the packing 26, an interface between the outer circumferential surface of the piston 13 and the inner circumferential surface of the slide hole 18 is sealed. Further, a base end portion of a piston rod 28 is connected to the piston 13, whereas a distal end portion of the piston rod 28 penetrates through a rod cover 30 that blocks one end of the slide hole 18 and extends externally outside of the slide hole 18.

A seal member 34, which forms a seal between the inner circumferential surface of the rod cover 30 and the outer circumferential surface of the piston rod 28, is installed in an annular groove 32 formed in an inner circumference of the rod cover 30. Further, another seal member 38, which forms a seal between the outer circumferential surface of the rod cover 30 and the inner circumferential surface of the slide hole 18, is installed in an annular groove 36 formed in the outer circumference of the rod cover 30.

Additionally, by supplying and discharging a pressure fluid such as compressed air or the like alternately to and from interiors of the two pressure chambers 20, 22 through the two ports 14, 16, the piston 13 is made to undergo reciprocating movements in the directions of the axis L2 of the slide hole 18 so as to advance and retract the piston rod 28. In some cases, the piston 13 is subjected to a transverse load. The transverse load is defined as a sideways force (force in a direction indicated by an arrow A in FIG. 1) that acts on the piston 13 through the piston rod 28, from a working member connected to the distal end of the piston rod 28, whereby the force tends to shift or incline the axis L1 of the piston 13 away from the axis L2 of the slide hole 18.

Figure 2:
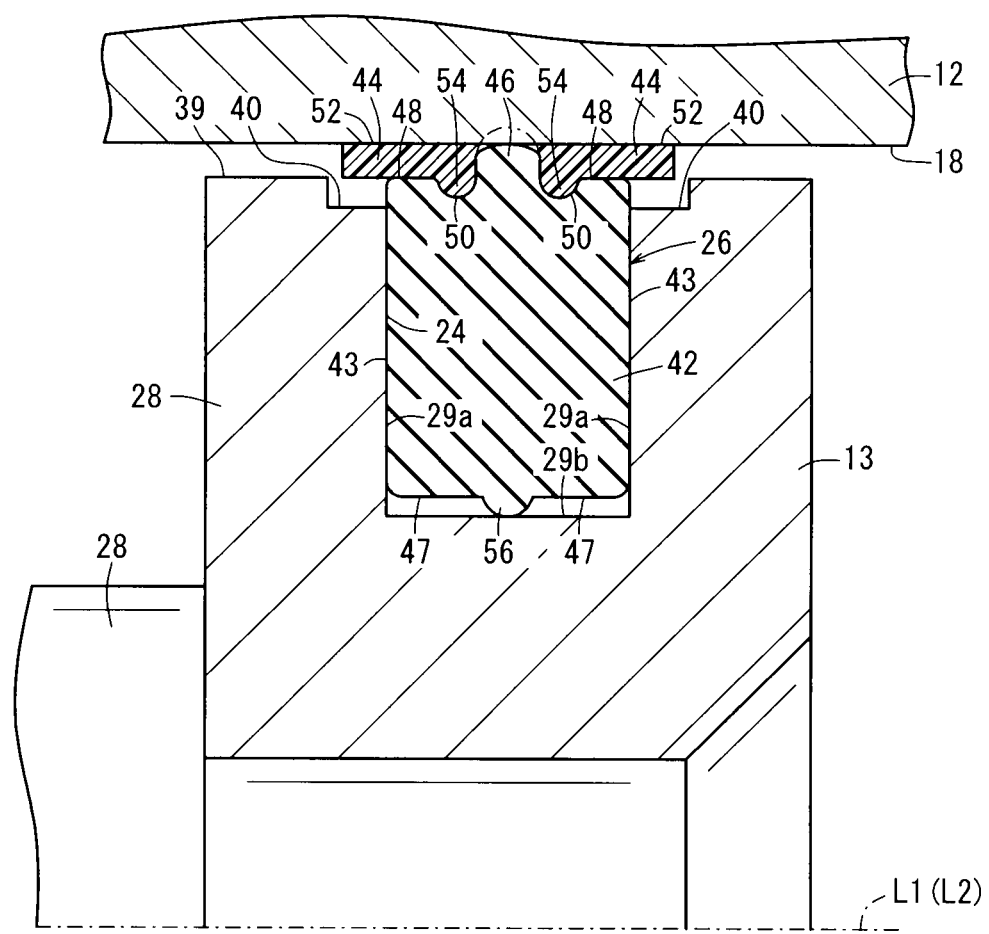
FIG. 2 is a fragmentary cross sectional view of a packing and locations proximate thereto when no transverse load acts on the piston.

FIG. 2 is an enlarged partial view of FIG. 1, and is a fragmentary cross sectional view showing the packing 26 and locations proximate thereto when no transverse load acts on the piston 13.

As shown in FIG. 2, the packing installation groove 24 is a groove surrounded on three sides by left and right side walls 29a and a groove bottom 29b. The left and right side walls 29a make up flat surfaces, respectively, perpendicular to the axis L1 of the piston 13 and which are arranged mutually in parallel. The groove bottom 29b makes up a surface, which is aligned parallel to the direction of the axis L1 of the piston 13. Accordingly, the packing installation groove 24 overall has a uniform groove width and a uniform depth. On the outer circumference of the piston 13, there are provided small-diameter portions 40 extending circumferentially at both sides of the packing installation groove 24 in the direction of the axis L1. The outer diameter of the small-diameter portions 40 is smaller than that of the outermost circumferential surface 39 of the piston 13.

Further, the packing 26 is formed by an annular seal member 42 made from an elastic material (for example, a rubber material), and by two support rings 44, which are mounted on the outer circumference of the seal member 42.

The seal member 42 is installed in the packing installation groove 24 of the piston 13. The seal member 42 has an outer circumference and an inner circumference, as well as side surfaces 43 at both sides in the direction of the axis L1, the side surfaces 43 being arranged mutually in parallel. The outer circumference of the seal member 42 is formed with a sealing projection 46 which at all times is in contact with the inner circumferential surface of the slide hole 18, two shoulder portions 48 positioned on both sides of the sealing projection 46 and which project outwardly from the packing installation groove 24, and concave grooves 50, which are U-shaped in cross section, interposed between the shoulder portions 48 and the sealing projection 46.

The sealing projection 46 is formed at a substantially central position on the packing 26 in the axial direction. The sealing projection 46 protrudes radially outwardly over the entire circumference of the packing 26 in the circumferential direction. As indicated by an imaginary line in FIG. 2, the outermost circumference of the sealing projection 46 has a substantially circular arc shape in cross section in a natural state (i.e., a state where no compressing load acts on the packing 26, and thus the packing 26 does not deform).

Further, the shoulder portions 48 make up surfaces, which are parallel to the direction of the axis L1 of the piston 13, and the diameters of the two shoulder portions 48 are substantially the same. Stated otherwise, a distance from the axis L1 of the piston 13 to one of the shoulder portions 48 and the distance from the axis L1 to the other of the shoulder portions 48 are mutually the same. In a state where no transverse load acts on the piston 13, the outer diameter of the shoulder portions 48 is smaller than that of the sealing projection 46, and is larger than that of the small-diameter portions 40 of the piston 13.

The support rings 44 are made of a low-friction material. Accordingly, the friction coefficient between the support rings 44 (more specifically, support surfaces 52) and the inner circumferential surface of the slide hole 18 is smaller than that between the seal member 42 (more specifically, the sealing projection 46) and the inner circumferential surface of the slide hole 18. Such a low-friction material includes a synthetic resin material having a low friction and abrasion resistant property, such as, for example, polytetrafluoroethylene (PTFE), or a metallic material.

The support rings 44 are disposed respectively on both sides of the sealing projection 46. One end of each support ring 44 is approximate to or abuts against a side surface of the sealing projection 46, while the other end thereof protrudes from a side surface 43 of the seal member 42 in the axial direction. The support rings 44 have support surfaces 52, which are parallel on the outer circumference thereof with the direction of the axis L1 of the piston 13.

The support rings 44 have engagement projections 54 having U-shaped cross sections on the inner circumference thereof. By engagement of the projections 54 within the concave grooves 50, the support rings 44 are mounted on the seal member 42 so as to surround outer circumferences of the shoulder portions 48.

On the inner circumference of the seal member 42, an inner circumferential projection 56 for sealing, which is semicircular in cross section, is formed in elastic contact with the groove bottom 29b of the packing installation groove 24. The inner circumferential projection 56 is disposed at a position along the direction of the axis L1 of the piston 13 equivalent to that of the sealing projection 46, and more specifically, is disposed in a center position on the inner circumference of the seal member 42. The width and height of the inner circumferential projection 56 are smaller than those of the sealing projection 46.

Figure 4:
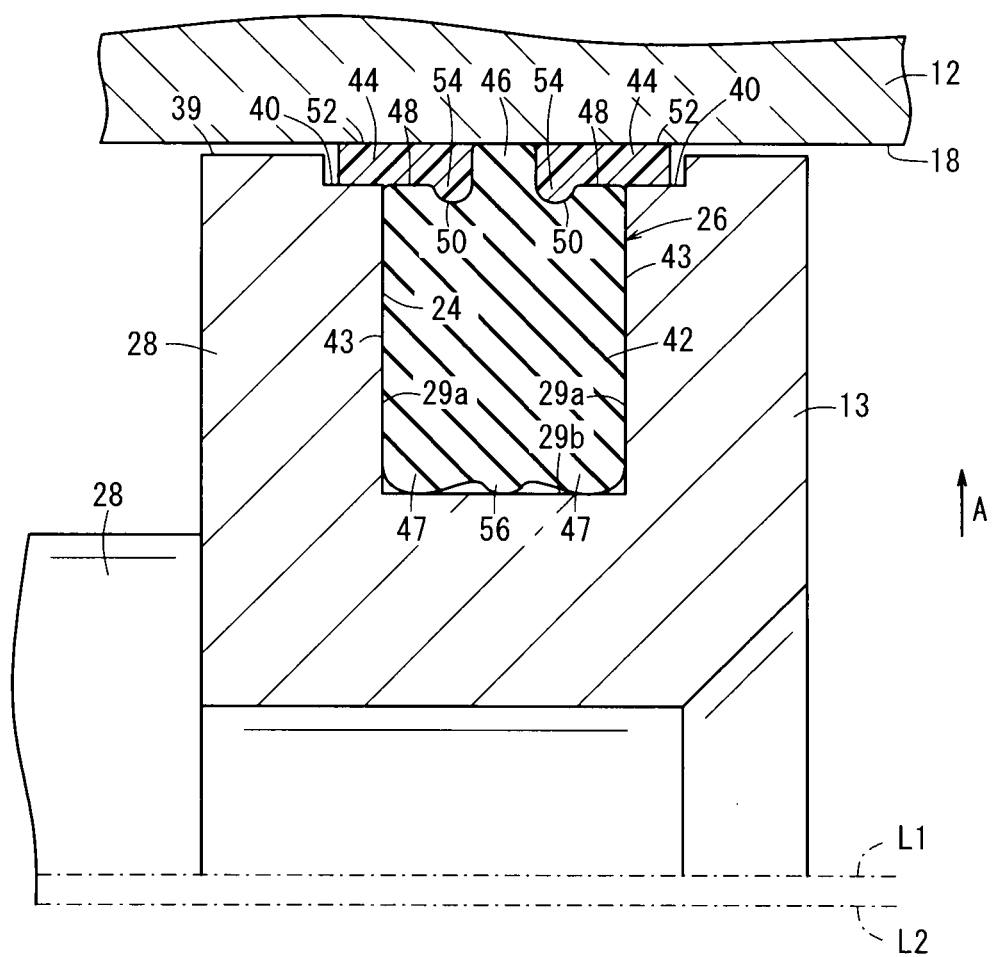
FIG. 4 is a fragmentary cross sectional view of the packing and locations proximate thereto when a large transverse load acts on the piston.

Further, on both sides of the inner circumferential projection 56 on the inner circumference of the seal member 42, abutment surfaces 47 are provided, portions of which come into abutment with the groove bottom 29b when the inner circumferential projection 56 is compressed and pressed toward the groove bottom 29b of the packing installation groove 24 (see FIG. 4). In a state in which the piston 13 is not installed inside the slide hole 18, the abutment surfaces 47 are surfaces parallel with the direction of the axis L1 of the piston 13, and at this time, the diameters of the two abutment surfaces 47 on both sides of the inner circumferential projection 56 are mutually equivalent.

The inner circumferential projection 56 can also be disposed at another position, which is different from the position of the sealing projection 46 in the direction of the axis L1 of the piston 13.

The fluid pressure apparatus 10 according to the present embodiment is basically constructed as above, and operation and effects thereof will be described below.

As shown in FIG. 2, in a state in which a transverse load does not act on the piston 13, the sealing projection 46 is in abutment against the inner circumferential surface of the slide hole 18, and then is elastically compressed and deformed. The deformation amount of the sealing projection 46 due to the elastic compression is substantially uniform over the entire circumference around the axis. Further, the outer circumferential surfaces of the support rings 44 are in abutment against the inner circumferential surface of the slide hole 18 over the entire circumference around the axis. At that time, the inner circumferential surfaces of the protruding ends of the support rings 44 are not abutment against the outer circumference of the piston 13, i.e., out of contact with respect to the outer circumference of the piston 13.

In a state as shown in FIG. 2, the piston 13 reciprocates along the directions of the axis L2 of the slide hole 18, and thus the outer circumferential surfaces of the support rings 44 move such that the support surfaces 52 of the support rings 44 are in contact with respect to the inner circumferential surface of the slide hole 18, i.e., making sliding movements. In this case, because the support rings 44 are made of a low-frictional material, frictional resistance between the support surfaces 52 and the inner circumferential surface of the slide hole 18 is sufficiently small, and therefore the piston 13 continues to operate smoothly and stably.

Figure 3:
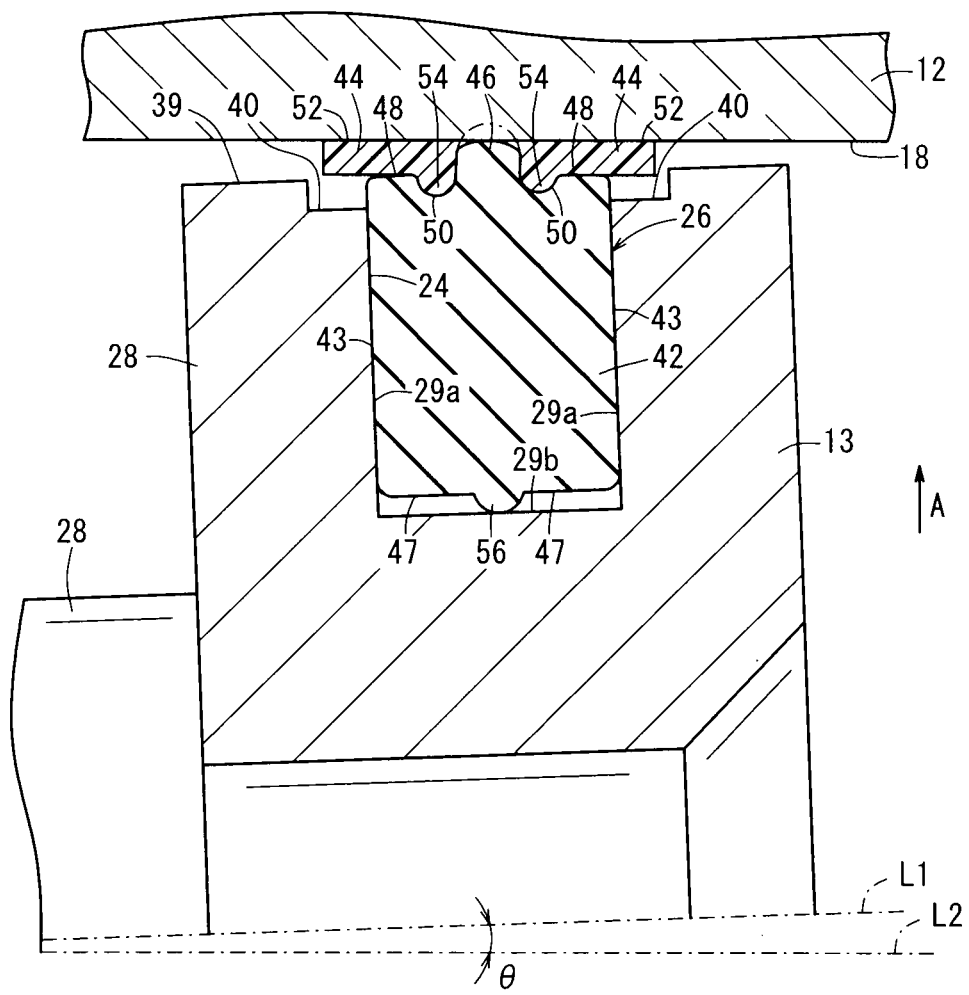
FIG. 3 is a fragmentary cross sectional view of the packing and locations proximate thereto when a small transverse load acts on the piston.

As shown in FIG. 3, in a case where a small transverse load acts on the piston 13 in the direction indicated by the arrow A, the axis L1 of the piston 13 is inclined to the axis L2 of the slide hole 18 at an angle θ. However, the axis L1 of the support rings 44 is kept parallel to the axis L2 of the slide hole 18. Thus, the contact state between the support surfaces 52 of the support rings 44 and the inner circumferential surface of the slide hole 18 is the same as the state shown in FIG. 2, and accordingly the deformation amount of the sealing projection 46 due to the elastic compression is also the same as the state shown in FIG. 2. Further, even in the case where a small transverse load acts on the piston 13, since the outer circumferential surfaces of the support rings 44 are in surface contact with the inner circumferential surface of the slide hole 18, the sliding resistance therebetween is prevented from excessively increasing, and therefore the piston 13 continues to operate smoothly and stably.

As shown in FIG. 4, in a case where a large transverse load acts on the piston 13 in the direction indicated by the arrow A, the inner circumferential surfaces of the support rings 44 are in abutment against the outer circumferential surface of the piston 13 (i.e., the small-diameter portions 40 in FIG. 4). On the other hand, since the support surfaces 52 of the support rings 44 are positioned radially outside the outermost circumference of the piston 13, the outer circumference of the piston 13 is out of contact with the inner circumferential surface of the slide hole 18. Thus, the support rings 44 prevent the piston 13 from contacting with the inner circumferential surface of the slide hole 18.

In this state, the contact state between the support surfaces 52 of the support rings 44 and the inner circumferential surface of the slide hole 18 is the same as the state shown in FIGS. 2 and 3, and accordingly the deformation amount of the sealing projection 46 due to the elastic compression is also the same as the state shown in FIGS. 2 and 3. Further, even in the case where a large transverse load acts on the piston 13, since the outer circumferential surfaces of the support rings 44 are in surface contact with the inner circumferential surface of the slide hole 18, the sliding resistance therebetween is prevented from excessively increasing, and therefore the piston 13 continues to operate smoothly and stably.

As described above, according to the fluid pressure apparatus 10 of the present embodiment, when a transverse load acts on the piston 13, part of the inner circumferences of the support rings 44 is in contact with part of the outer circumference of the piston 13, whereby a transverse displacement of the piston 13 is regulated. Thus, the sealing projection of the seal member 42 is prevented from excessively deforming, and the piston 13 is prevented from contacting with the inner circumferential surface of the slide hole 18. As described above, since the support rings 44 have at least functions equivalent to those of a conventional wear ring, it is not necessary to arrange a separate wear ring together with the packing 26 on the piston 13 at an interval in the direction of the axis L1 of the piston 13. Accordingly, the present invention is simple in structure, and increase in the size of the piston 13 in the direction of the axis L1 can be suppressed.

With the above structure, the support rings 44 include the engagement projections 54 on the inner circumferences thereof. Thus, by engaging the projections 54 into the concave grooves 50, the support rings 44 are mounted on the seal member 42 so as to surround the outer circumferences of the shoulder portions 48. As a result, the support rings 44 can be mounted on the seal member 42 more easily.

Also with the above structure, whether a transverse load acts on the piston 13 or not, the support rings 44 at all times are in contact with the inner circumferential surface of the slide hole 18, and the deformation amounts of the sealing projection 46 in respective states are the same. Thus, the contact surface pressure and the contact area between the sealing projection 46 and the slide hole 18 are the same whether a transverse load acts on the piston 13 or not. Therefore, it becomes easier to control the sliding resistance of the piston 13.

Further, the seal member 42 includes, on the inner circumference thereof, the sealing inner circumferential projection 56 which is in elastic contact with the groove bottom 29b of the packing installation groove 24. Thus, an interface between the inner circumference of the seal member 42 and the groove bottom of the packing installation groove 24 is sealed, and flow of fluid therebetween is blocked effectively.

Figure 5:
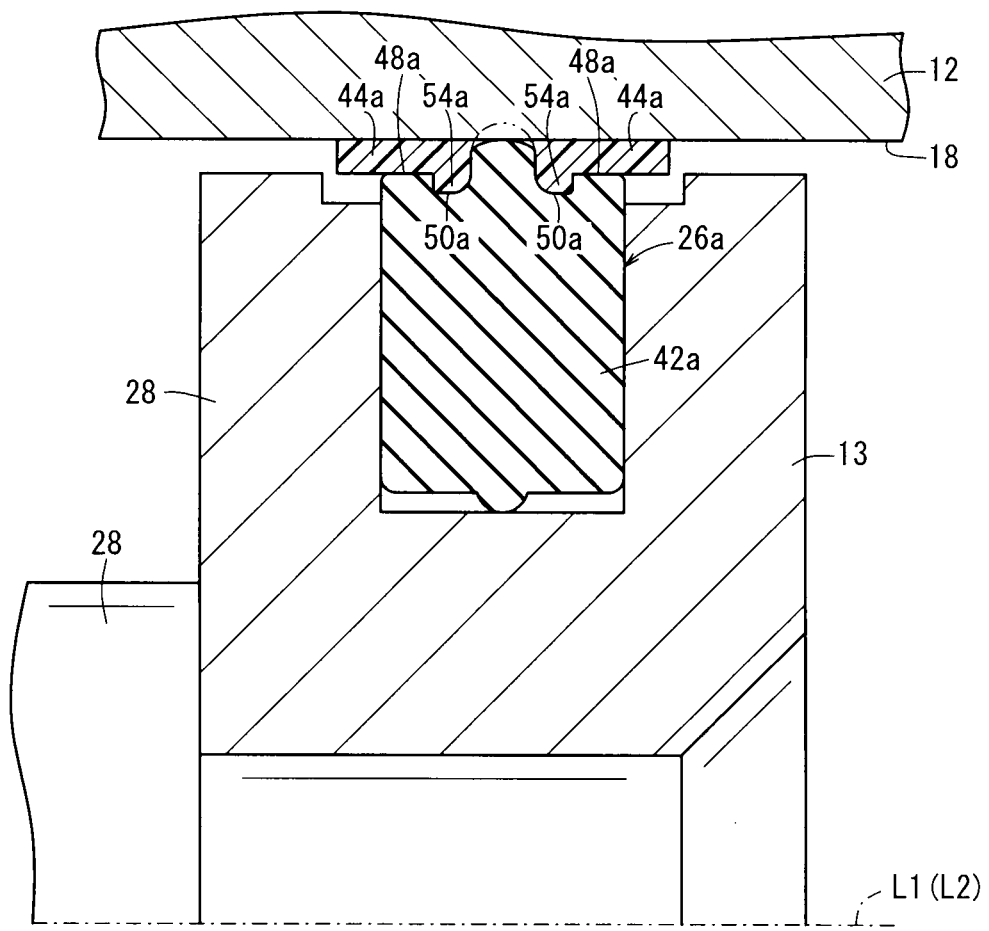
FIG. 5 is a fragmentary cross sectional view of a packing according to a first modification and locations proximate thereto.

FIG. 5 is a fragmentary cross sectional view of a packing 26a according to a first modification and locations approximate thereto. In the above-mentioned embodiment, although the concave grooves 50 on the outer circumference of the seal member 42 and the projections 54 on the inner circumference of the support rings 44 are formed to be U-shaped in cross section, the concave grooves 50 and the projections 54 can be formed in other shapes. For example, like a seal member 42a and support rings 44a as shown in FIG. 5, groove surfaces of the concave grooves 50a proximate to the shoulder portions 48a, and side surfaces of the projections 54a that correspond to the groove surfaces can be formed as flat surfaces perpendicular to the axis of the seal member 42a. The structure of the packing 26a is identical to that of the packing 26 shown in FIG. 2 except for the above parts.

With the structure according to the first modification, the support rings 44a can engage reliably with respect to the seal member 42a. Alternatively, left and right groove surfaces of the concave grooves 50a can be formed as mutually parallel flat surfaces, and the bottom surface thereof may be arranged parallel with the axis of the piston 13. The cross sectional shape of the projections 54 can be formed with shapes similar to the groove shape of the concave grooves 50a.

Figure 6:
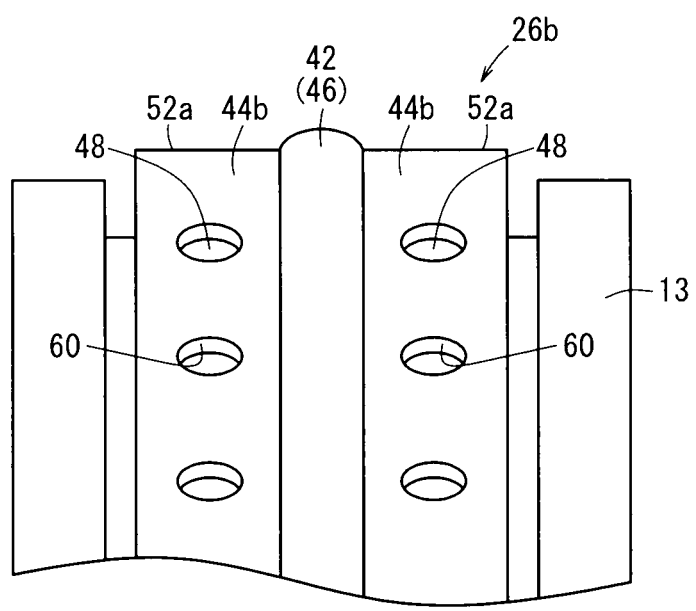
FIG. 6 is a fragmentary side view of a packing according to a second modification and locations proximate thereto.

Also, like a packing 26b according to a second modification shown in FIG. 6, a plurality of holes 60 may be formed circumferentially in each support ring 44b at intervals. In FIG. 6, the holes 60 are arranged at equal intervals. The holes 60 extend through the support ring 44 in the thickness direction. Instead of such holes 60, recesses may be formed circumferentially at intervals in the outer circumferential surfaces of the support rings 44 shown in FIGS. 2 to 4 or in the outer circumferential surfaces of the support rings 44a shown in FIG. 5. Such recesses are formed as holes (dents) that do not penetrate the support ring 44, 44a in the thickness direction.

Such holes 60 or recesses possess a function to retain grease therein. Therefore, by retaining grease in the interiors thereof, suitable slidability between the support surfaces 52a and the inner surface of the slide hole 18 can be maintained over a long period.

In the foregoing description, a fluid pressure cylinder 10A has been shown as one example of a fluid pressure apparatus 10. However, the fluid pressure apparatus 10 may also comprise a fluid changeover valve, in which a fluid passage is switched by means of a spool that slides along the interior of a slide hole 18 formed in a housing 12. In this case, the spool forms the partitioning member.

In the above embodiment, and the first and second modifications, explanations have been made concerning the case where the support rings 44 (44a, 44b) are provided at both sides of the sealing projection 46. However, the support ring may be provided at one side of the sealing projection 46. In this case, the shoulder portion 48 may be provided only at the side where the support ring 44 is disposed.

Although a certain preferred embodiment of the present invention have been shown and described in detail, the present invention is not limited to the embodiment described above, and it should be understood that various changes and modifications may be made therein without departing from the scope of the appended claims.

What is claimed is:

1. A fluid pressure apparatus comprising:
a housing including a slide hole formed therein;
a partitioning member that moves in an axial direction along an interior of the slide hole; and
a packing that is installed on an outer circumference of the partitioning member,
wherein the packing comprises an annular seal member made of an elastic material, and at least one support ring made of a low-friction material, the seal member being installed in an annular packing installation groove formed on an outer circumference of the partitioning member, the at least one support ring being mounted on an outer circumference of the seal member;

the seal member includes, on the outer circumference thereof, a sealing projection that contacts an inner circumferential surface of the slide hole, and at least one shoulder portion formed on both sides or one side of the sealing projection and which project outwardly from the packing installation groove;

the at least one support ring is provided on both sides or one side of the sealing projection, and protrudes from the seal member in an axial direction thereof; and the at least one support ring includes a support surface, which is parallel on an outer circumference thereof with an axial direction of the partitioning member, and wherein when a transverse load does not act on the partitioning member, the sealing projection is pressed against the inner circumferential surface of the slide hole and thereby is elastically compressed and deformed, and the support surface of the at least one support ring contacts with the inner circumferential surface of the slide hole while an inner circumferential surface of the at least one support ring is out of contact with the outer circumference of the partitioning member; and when at least a certain amount of transverse load acts on the partitioning member, the sealing projection is pressed against the inner circumferential surface of the slide hole and thereby is elastically compressed and deformed, and the support surface of the at least one support ring contacts with the inner circumferential surface of the slide hole while the inner circumferential surface of the at least one support ring contacts with the outer circumference of the partitioning member.

2. The fluid pressure apparatus according to claim 1, wherein the seal member further includes, on the outer circumference thereof, at least one concave groove interposed between the at least one shoulder portion and the sealing projection;

the at least one support ring further includes, on the inner circumference thereof, at least one projection for engagement; and by engagement of the at least one projection in the at least one concave groove, the at least one support ring is mounted on the seal member so as to surround an outer circumference of the at least one shoulder portion.

3. The fluid pressure apparatus according to claim 1, wherein a deformation amount of the sealing projection due to elastic compression is the same whether a transverse load acts on the partitioning member or not.

4. The fluid pressure apparatus according to claim 1, wherein an inner circumferential projection for sealing is formed on the inner circumference of the seal member in elastic contact with a groove bottom of the packing installation groove.

* * * * *